No. 662,651. Patented Nov. 27, 1900.
A. S. KROTZ.
RUBBER TIRE SETTER.
(Application filed Feb. 26, 1900.)
(No Model.)
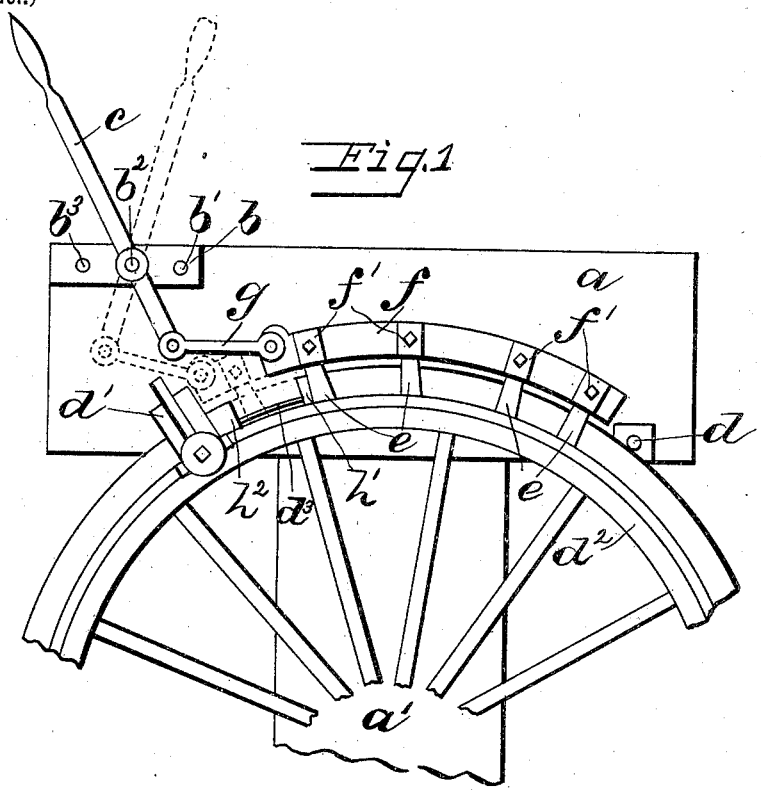
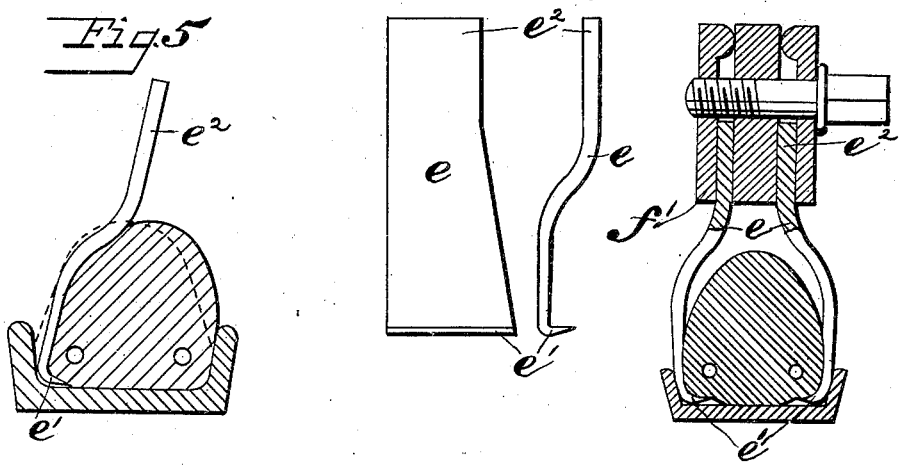
Witnesses
F. L. Walker
Chas. I. Welsh
Inventor
By his Attorney

UNITED STATES PATENT OFFICE.

ALVARO S. KROTZ, OF SPRINGFIELD, OHIO, ASSIGNOR TO THE CONSOLIDATED RUBBER TIRE COMPANY, OF NEW YORK, N. Y.

RUBBER-TIRE SETTER.

SPECIFICATION forming part of Letters Patent No. 662,651, dated November 27, 1900.

Application filed February 26, 1900. Serial No. 6,437. (No model.)

*To all whom it may concern:*

Be it known that I, ALVARO S. KROTZ, a citizen of the United States, residing at Springfield, in the county of Clark and State of Ohio, have invented certain new and useful Improvements in Devices for Equipping Vehicle-Wheels with Rubber Tires, of which the following is a specification.

My invention relates to improvements in devices for applying rubber tires to vehicle-wheels; and it consists of a device for closing the space between the ends of the rubber after the ends of the retaining-bands have been tightened or fastened.

In the drawings, Figure 1 is a plan view of my device, together with a portion of the rubber-tired wheel. Fig. 2 is a sectional view of the rubber tire and clamp or pulling-bar. Figs. 3 and 4 are detail views of the device for gripping the rubber. Fig. 5 is a detail view showing manner of removing the rubber-gripping device from the tire.

Like parts are represented by similar letters of reference in the several views.

In the form of rubber tires largely in use for vehicles there are employed as retaining devices bands of metal, which pass through the rubber, and it is desirable in applying this rubber to the wheel to place the rubber, with the bands extending through them, within the channel-iron of the rim of the wheel before fastening together the ends of the retaining-bands. A space is necessarily formed at the point where the bands are fastened for the purpose of having ready access to the wires, and though the rubber is compressed before being placed within the channel the friction between the rubber and channel is such that it is necessary to provide means for closing the space formed at said joint, and in the device described herein I have provided means for closing this space.

In Fig. 1, $a$ represents a bed or table upon which I mount the block $b$, with pins $b'$, $b^2$, and $b^3$ projecting from its upper surface, any one of which may serve as a fulcrum for the lever $c$, which is formed to fit over any one of said pins. There is also mounted on this bed or table a block with a stop-pin $d$, against which the wheel $d^2$ rests, and $d'$ is a clamp for clamping said wheel in position. $a'$ represents a table upon which said wheel is supported. A link $g$ connects one end of said lever $c$ with one end of a clamp or pulling bar $f$. Before the retaining-bands $b^3$ are fastened L-shaped hooks $e$ are placed under the tire, as shown in Figs. 1 and 2, one hook being placed back of the other. The extension $e'$ of each L-shaped hook is placed under the tire, said extension engaging the bottom of said rubber tire, while the upper portion $e^2$ engages with one of the clamps $f'$ on the clamp or pulling bar $f$. The L-shaped hooks are bent near the middle of their main stem, forming a sloping shoulder $e$, practically conforming in shape to the upper part of the sides of the tire. This sloping shoulder assists in removing the hooks after the tire is in place, as shown in Fig. 5, and further permits of a narrower construction of the pulling-bar, as shown in Fig. 6, making it less expensive and more easily operated. It can readily be seen that by disengaging the upper portion $e$ of the L-shaped hook from the clamp $f'$ the L-shaped hook can be forced from engagement with the tire, as shown in Fig. 5. When the lever $c$ is operated, the clamp or pulling bar $f$ is pulled along until the lever link and bar assume the position shown in dotted line of Fig. 1, and for convenience the lever may be shifted to any pin on the block $b$ which will permit a greater or less movement of said bar. After the ends $h'$ and $h^2$ of the tire are drawn together the L-shaped hooks are removed by pulling the upper portion $e^2$ of the L-shaped hook toward the tire, thus prying the extension $e'$ from under the tire, the rubber tire itself serving as a fulcrum, as shown in Fig. 5. I have thus shown means by which the rubber will be drawn back against the friction of the rubber and channel to a position which it will maintain owing to the pressure of the rubber, and it is readily seen that the pairs of L-shaped hooks act as sets of clamps, clamping the rubber at the bottom and sides thereof, but being readily removed in the manner I have shown when the rubber has been drawn to the desired position.

For matter shown but not claimed reference is had to my application Serial No. 6,435.

Having thus described my invention, I claim as follows:

1. In a rubber-tire-pulling machine, the combination of L-shaped hooks, shaped to conform to the bottom and lower part of the sides of the tire, and bent near the middle of their main stem forming a sloping shoulder practically conforming in slope with the upper part of the sides of the tire, said shoulders assisting to remove the hooks after the tire is in place, and means for pulling said hooks for the purpose of closing the rubber tire.

2. The tire-pulling device consisting of L-shaped hooks to engage the bottom and the lower part of the respective sides of said tire, said hooks being bent near the middle of their main stem forming a sloping shoulder practically conforming in shape to the upper part of the sides of said tire, said sloping shoulder assisting to remove the hooks after the tire is in place and permitting the upper ends of said hooks on opposite sides of said tire being brought more closely to each other, and a pulling-bar clamp to clamp said hooks at their upper ends and means for pulling said pulling-bar clamp.

In testimony whereof I have hereunto set my hand this 13th day of September, A. D. 1899.

ALVARO S. KROTZ.

Witnesses:
CHAS. I. WELCH,
EDMOND J. OGDEN.